U S008620027B2

(12) United States Patent
Tseng et al.

(10) Patent No.: US 8,620,027 B2
(45) Date of Patent: Dec. 31, 2013

(54) AUGMENTED REALITY-BASED FILE TRANSFER METHOD AND FILE TRANSFER SYSTEM THEREOF

(75) Inventors: Yu-Chee Tseng, New Taipei (TW); Lien-Wu Chen, New Taipei (TW); Yu-Hao Peng, New Taipei (TW)

(73) Assignee: Acer Incorporated, Xizhi Dist., New Taipei (TW)

( * ) Notice: Subject to any disclaimer, the term of this patent is extended or adjusted under 35 U.S.C. 154(b) by 155 days.

(21) Appl. No.: 13/363,381

(22) Filed: Feb. 1, 2012

(65) Prior Publication Data

US 2012/0219181 A1 Aug. 30, 2012

(30) Foreign Application Priority Data

Feb. 25, 2011 (TW) .............................. 100106484 A

(51) Int. Cl.
*G06K 9/00* (2006.01)
*G06F 21/00* (2013.01)

(52) U.S. Cl.
USPC .............................. 382/103; 382/291; 705/51

(58) Field of Classification Search
USPC ......... 382/100, 103, 106–107, 118, 155, 157, 382/162, 168, 173, 181, 189, 209, 219, 232, 382/254, 274, 276, 286, 291, 205, 312; 705/52, 51; 707/104.1; 713/189; 715/723
See application file for complete search history.

(56) References Cited

U.S. PATENT DOCUMENTS

| 8,392,834 B2 * | 3/2013 | Obrador ........................ 715/723 |
| 8,396,801 B1 * | 3/2013 | Dala et al. ........................ 705/52 |
| 2004/0008226 A1 | 1/2004 | Manolis et al. |
| 2009/0037477 A1 * | 2/2009 | Choi et al. ................. 707/104.1 |
| 2011/0040980 A1 * | 2/2011 | Kerr et al. ..................... 713/189 |

FOREIGN PATENT DOCUMENTS

JP 2004220319 8/2004

OTHER PUBLICATIONS

Andrew Wray, Will AirDrop for Mac OS X Lion be coming to iOS?, Feb. 24, 2011, pp. 1-11, XP002677273, URL:http://www.imore.com/2011/02/24/airdrop-mac-os-lion-coming-ios/.

* cited by examiner

*Primary Examiner* — Seyed Azarian
(74) *Attorney, Agent, or Firm* — Winston Hsu; Scott Margo

(57) ABSTRACT

An augmented reality-based file transfer method and a related file transfer system integrated with cloud computing are provided. The file transfer method is applied to file transmission between a first device and a second device wirelessly connected to each other, wherein the first device includes a file, a display unit, and an input unit electronically connected to the display unit. The file transfer method includes the following steps: when an image stored in the first device is opened, displaying the file and the image on the display unit of the first device, wherein the image comprises a face image of the second user; when the file is dragged to the face image of the second user shown in the image via the input unit and is then released, generating a command; and transferring the file from the first device to the second device according to the command.

12 Claims, 7 Drawing Sheets

AUGMENTED REALITY-BASED FILE TRANSFER METHOD AND FILE TRANSFER SYSTEM THEREOF

BACKGROUND OF THE INVENTION

1. Field of the Invention

The present invention relates to a file transfer method and a file transfer system, and more particularly, to an augmented reality-based file transfer method and file transfer system integrated with cloud computing.

2. Description of the Prior Art

With the progress of technology development and innovation, information deliver method is changed from previous way of writing letters into the use of electronic method as information deliver media. The information transfer related technology has been increasingly popular and widely used in all fields, and there are various information transfer methods. Currently, the most popular file transfer method is to access file (s) through e-mail, or communication software such as MSN messenger and File Transfer Protocol (FTP), or by using physical portable storage devices such as flash drives, memory cards, CDs, and hard disk drives, etc., and then to transfer the file(s) to other users.

However, it's inconvenient to transfer files through the abovementioned file transferring media, such as, e-mail, communication software, and File Transfer Protocol (FTP), since the user needs to know the other user's account in advance. In addition, it will spend much time if we access files from other user's electronic devices, such as mobile phones or notebooks, through portable storage devices.

Hence, how to solve the inconvenience and time-consuming problem that a user must know other user's accounts or must access files through physical portable storage devices when the user desires to transfer files to other users.

SUMMARY OF THE INVENTION

It is therefore one of the objectives of the claimed invention to provide an augmented reality-based file transfer method and file transfer system integrated with cloud computing, such that dynamic videos or static photos can be used as a user-friendly interface for transferring files from one user to other users (from one device to other devices).

According to an exemplary embodiment of the present invention, a file transfer method is provided in order to achieve one of the objectives of the claimed invention. The file transfer method is applied to file transmission between a first device owned by a first user and a second device owned by a second user, wherein the first device is wirelessly connected to the second device. The first device includes a file, a display unit, and an input unit electronically connected to the display unit. The file transfer method includes the following steps: when an image stored in the first device is opened, displaying the file and the image on the display unit of the first device, wherein the image comprises a face image of the second user; when the file is dragged to the face image of the second user shown in the image via the input unit and is then released, generating a command; and transferring the file from the first device to the second device according to the command.

In one embodiment, the first device further includes a photographing module. The file transfer method further includes: capturing the image comprising the face image of the second user by manipulating the photographing module.

In one embodiment, the first device and the second device are wirelessly connected to a server, and the step of transferring the file from the first device to the second device comprises: storing a plurality of photos comprising faces of different users into a database of the server as a comparison basis; when the file is dragged to the face image of the second user shown in the image and is then released, capturing a released position on the image where the file is released and accordingly generating a first coordinate by using the first device; transferring the first coordinate and the image from the first device to the server; after the first coordinate and the image are received by the server, performing a face detection in order to find out the position of the face image of the second user shown in the image, and accordingly generating a second coordinate; determining whether the first coordinate falls on the second coordinate; if the first coordinate does not fall on the second coordinate, transmitting an error message to the first device through the server, such that the file is re-dragged to the face image of the second user shown in the image according to the error message; if the first coordinate falls on the second coordinate, performing a face recognition through the server in order to compare the face of the second user with the faces of different users of the plurality of photos stored in the database, and accordingly generating a response message; transmitting, by the server, the response message to the first device; transferring the file from the first device to the sever according to the response message; and transferring the file from the server to the second device.

In one embodiment, when the second device and the server are in a disconnected state, the server is configured to temporarily store the file in the database, or the server is configured to transfer the file to the second device by using an e-mail, a communication software, or a file transfer protocol (ftp).

In one embodiment, the file transfer method further includes the following steps: performing, by the first device, a registration action to the server; uploading the plurality of photos, by the first device, to the server, wherein each of the plurality of photos comprises one of a face image of the first user and a face image of the second user; receiving the plurality of photos, by the server, in order to determine whether the face images of the plurality of photos conform to a qualified criterion and whether a number of the plurality of photos satisfies a bottom limit set by the server; and when the number of the uploaded photos satisfies the bottom limit, storing the plurality of photos confirming to the qualified criterion into the database in order to complete the registration action.

According to another exemplary embodiment of the present invention, an augmented reality-based file transfer method integrated with cloud computing is provided in order to achieve one of the objectives of the claimed invention. The file transfer method is applied to file transmission between a first device owned by a first user and a second device owned by a second user, wherein the first device is wirelessly connected to the second device. The first device includes a file, a display unit, and an input unit electronically connected to the display unit. The file transfer method includes the following steps: when an image of the second user stored in the first device is opened, displaying the file and the image on the display unit of the first device, wherein the image comprises a face image of the second user; when the face image is dragged to the file via the input unit and is then released, generating a command; and transferring the file from the first device to the second device according to the command.

In one embodiment, the first device further includes a photographing module. The file transfer method further comprises: capturing the image comprising the face image of the second user by manipulating the photographing module.

In one embodiment, the first device and the second device are wirelessly connected to a server, and the step of transferring the file from the first device to the second device comprises: storing a plurality of photos comprising faces of different users into a database of the server as a comparison basis; when the face image of the image is dragged to the file and is then released, capturing a released position on the file where the face image of the image is released and accordingly generating a first coordinate by using the first device; transforming, by the first device, a position of the file into a second coordinate; transferring, by the first device, the first coordinate and the second coordinate to the server; after the first coordinate and the second coordinate are received by the server, performing a face detection in order to determine whether the first coordinate falls on the second coordinate; if the first coordinate does not fall on the second coordinate, transmitting an error message to the first device through the server, such that the face image of the image is re-dragged to the file according to the error message; if the first coordinate falls on the second coordinate, performing a face recognition through the server in order to compare the face of the image with the faces of different users of the plurality of photos stored in the database, and accordingly generating a response message; transmitting, by the server, the response message to the first device; transferring the file from the first device to the server according to the response message; and transferring the file from the server to the second device.

In one embodiment, when the second device and the server are in a disconnected state, the server is configured to temporarily store the file in the database, or the server is configured to transfer the file to the second device by using an e-mail, a communication software, or a file transfer protocol (ftp).

According to another exemplary embodiment of the present invention, a file transfer system is provided in order to achieve one of the objectives of the claimed invention. The file transfer system includes a first device owned by a first user and a second device owned by a second user. The first device includes a file, a display unit, an input unit, and a processing unit electrically connected to the display unit and the input unit. When an image stored in the first device is opened, the display unit of the first device is configured to display the file and the image, wherein the image comprises a face image of the second user. When the file is dragged to the face image of the second user shown in the image via the input unit of the first device and is then released, the processing unit is configured to generate a command. The file is transferred from the first device to the second device according to the command.

In one embodiment, the first device further comprises a photographing module configured to capture the image comprising the face image of the second user.

In one embodiment, the file transfer system further comprises a server wirelessly connected to the first device and the second device. The server further comprises a database, configured to store a plurality of photos comprising faces of different users as a comparison basis. Herein, when the file is dragged to the face image of the second user shown in the image and is then released, the first device is configured to capture a released position on the image where the file is released and accordingly generate a first coordinate, and transfer the first coordinate and the image from the first device to the server; after the first coordinate and the image are received by the server, a face detection is performed, through the server, in order to find out the position of the face image of the second user shown in the image and accordingly generate a second coordinate; the server is further configured to determine whether the first coordinate falls on the second coordinate; if the first coordinate does not fall on the second coordinate, an error message is transmitted to the first device through the server, such that the file is re-dragged to the face image of the second user shown in the image according to the error message; if the first coordinate falls on the second coordinate, a face recognition is performed through the server in order to compare the face of the second user with the faces of different users of the plurality of photos stored in the database, and a response message is accordingly generated; the response message is transmitted, by the server, to the first device; the file is transferred from the first device to the server according to the response message; and the file is transferred from the server to the second device.

According to another exemplary embodiment of the present invention, a file transfer system is provided in order to achieve one of the objectives of the claimed invention. The file transfer system includes a first device owned by a first user and a second device owned by a second user. The first device includes a file, a display unit, an input unit, and a processing unit electrically connected to the display unit and the input unit. When an image of the second user stored in the first device is opened, the display unit of the first device is configured to display the file and the image, wherein the image comprises a face image of the second user; when the face image is dragged to file via the input unit and is then released, the processing unit is configured to generate a command; and the file is transferred from the first device to the second device according to the command.

In one embodiment, the file transfer system further comprises a server wirelessly connected to the first device and the second device. The server further comprises a database, configured to store a plurality of photos comprising faces of different users as a comparison basis. Herein, when the face image of the image is dragged to the file and is then released, the first device is configured to capture a released position on the file where the face image of the image is released and accordingly generate a first coordinate, transform a position of the file into a second coordinate, and transmit the first coordinate and the second coordinate to the server; after the first coordinate and the second coordinate are received by the server, a face detection is performed, through the server, in order to determine whether the first coordinate falls on the second coordinate; if the first coordinate does not fall on the second coordinate, an error message is transmitted to the first device through the server, such that the face image of the image is re-dragged to the file according to the error message; if the first coordinate falls on the second coordinate, a face recognition is performed through the server in order to compare the face of the second user with the faces of different users of the plurality of photos stored in the database, and a response message is accordingly generated; the response message is transmitted, by the server, to the first device; the file is transferred from the first device to the server according to the response message; and the file is transferred from the server to the second device.

These and other objectives of the present invention will no doubt become obvious to those of ordinary skill in the art after reading the following detailed description of the preferred embodiment that is illustrated in the various figures and drawings.

DETAILED DESCRIPTION

The augmented reality-based file transfer method and the file transfer system wirelessly connected to a cloud server, and its file transfer function is implemented by downloading application programs. In addition, the augmented reality (AR) user interface is applied in order to achieve the goal of simple user-friendly interface. Be noted that the augmented reality is an infinite extending of the virtual world and the real world.

Figure 1A:
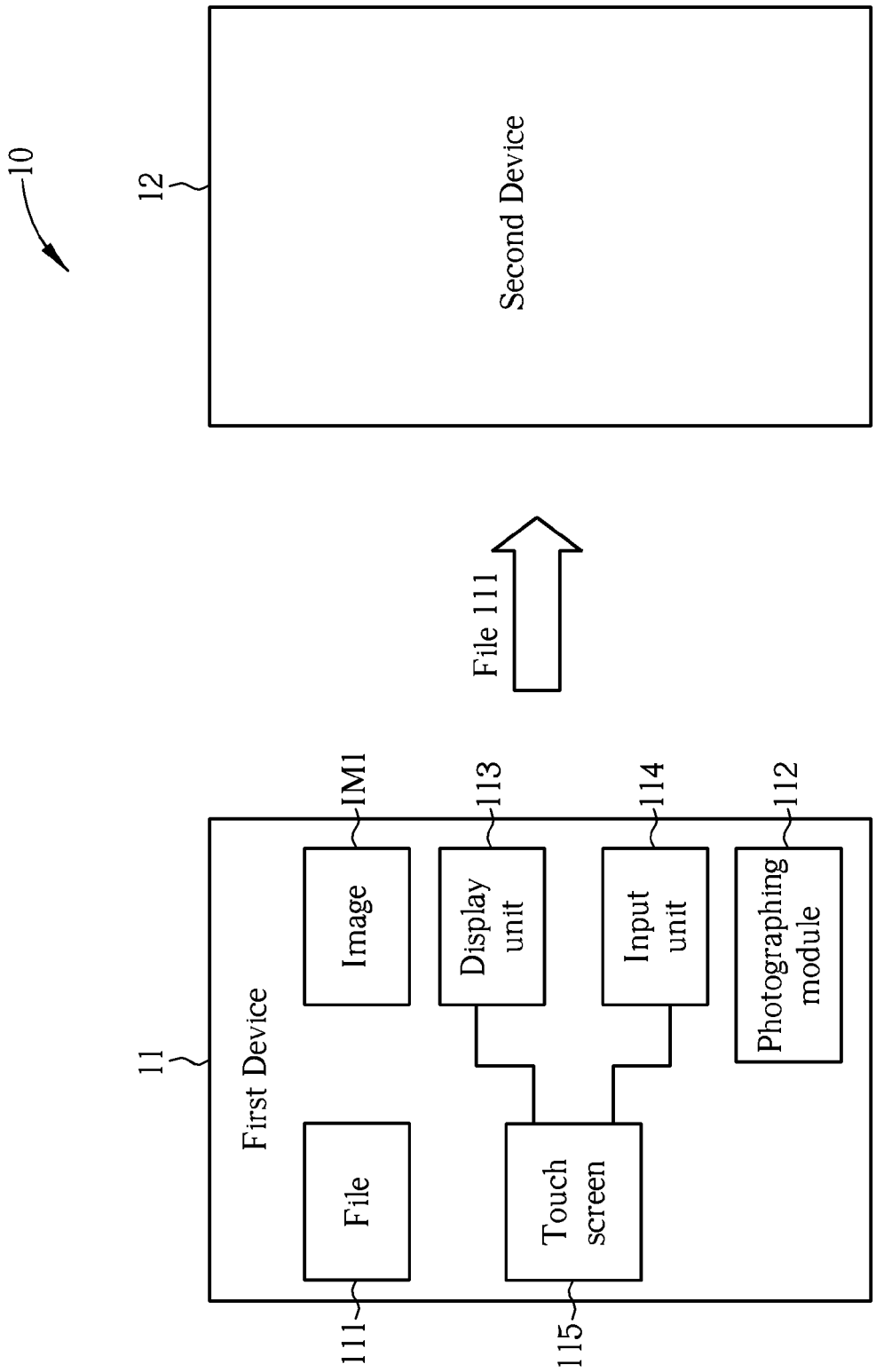
FIG. 1A is a block diagram showing a file transfer system according to a first embodiment of the present invention.
Figure 1B:
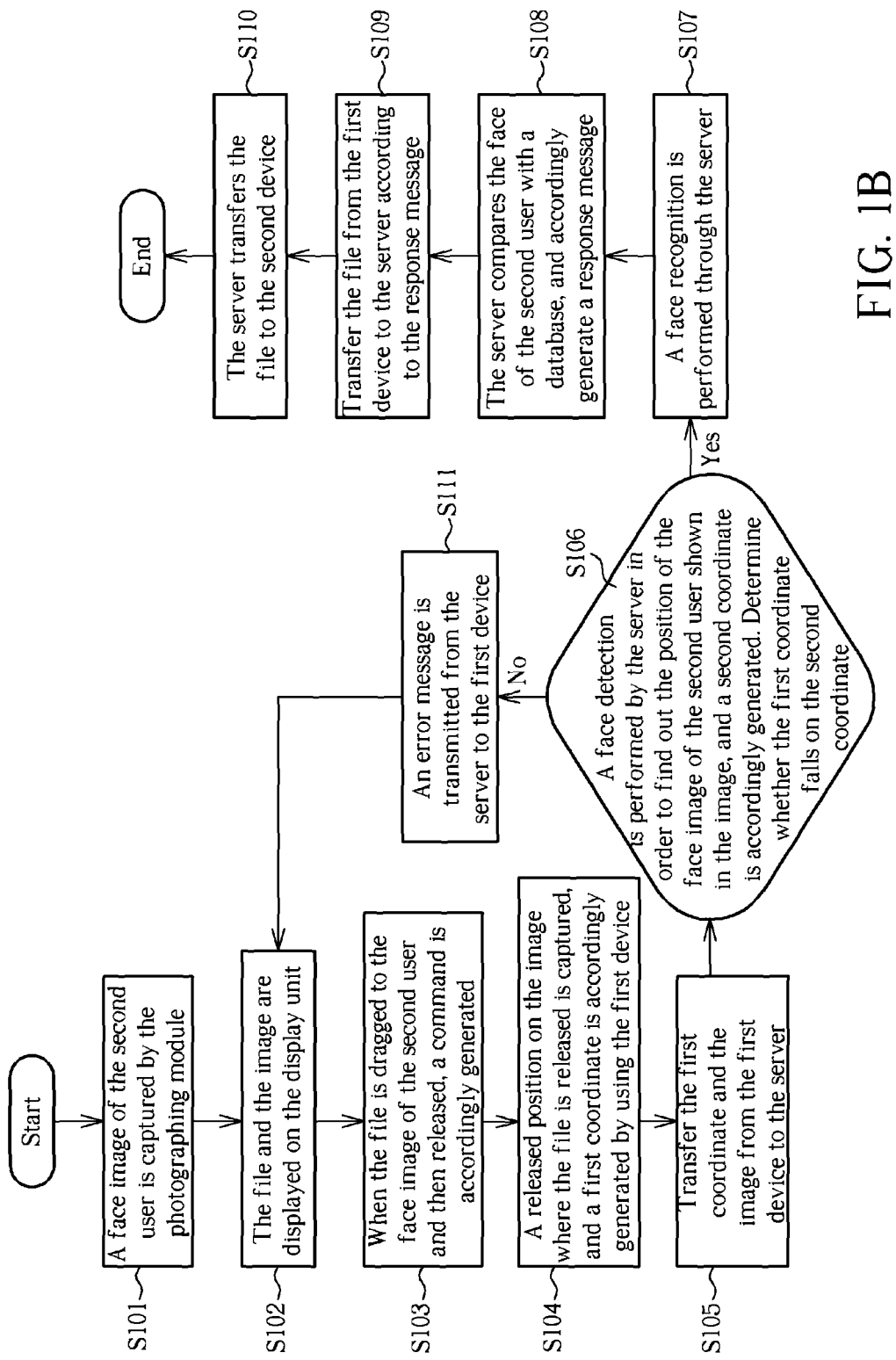
FIG. 1B is a flowchart illustrating a file transfer method according to one exemplary embodiment of the present invention.

Please refer to FIG. 1A together with FIG. 1B, wherein FIG. 1A is a block diagram showing a file transfer system according to a first embodiment of the present invention, and FIG. 1B is a flowchart illustrating a file transfer method according to one exemplary embodiment of the present invention. As shown in FIG. 1A, the file transfer system 10 includes a first device 11 and a second device 12, wherein the first device 11 is owned by a first user, and the second device 12 is owned by a second user. The first device 11 includes a file 111, a photographing module 112, a display unit 113, an input unit 114, and a processing unit 115, wherein the processing unit 115 is electrically connected to the display unit 113 and the input unit 114. When an image IM1 stored in the first device 11 is opened, the display unit 113 of the first device 11 is configured to display the file 111 and the image IM1, wherein the image IM1 includes a face image of the second user. When the file 111 is dragged to the face image of the second user shown in the image IM1 via the input unit 114 of the first device 11 and is then released, the processing unit 115 is configured to generate a command. After that, the file 111 is transferred from the first device 11 to the second device 12 according to the command.

Figure 1C:
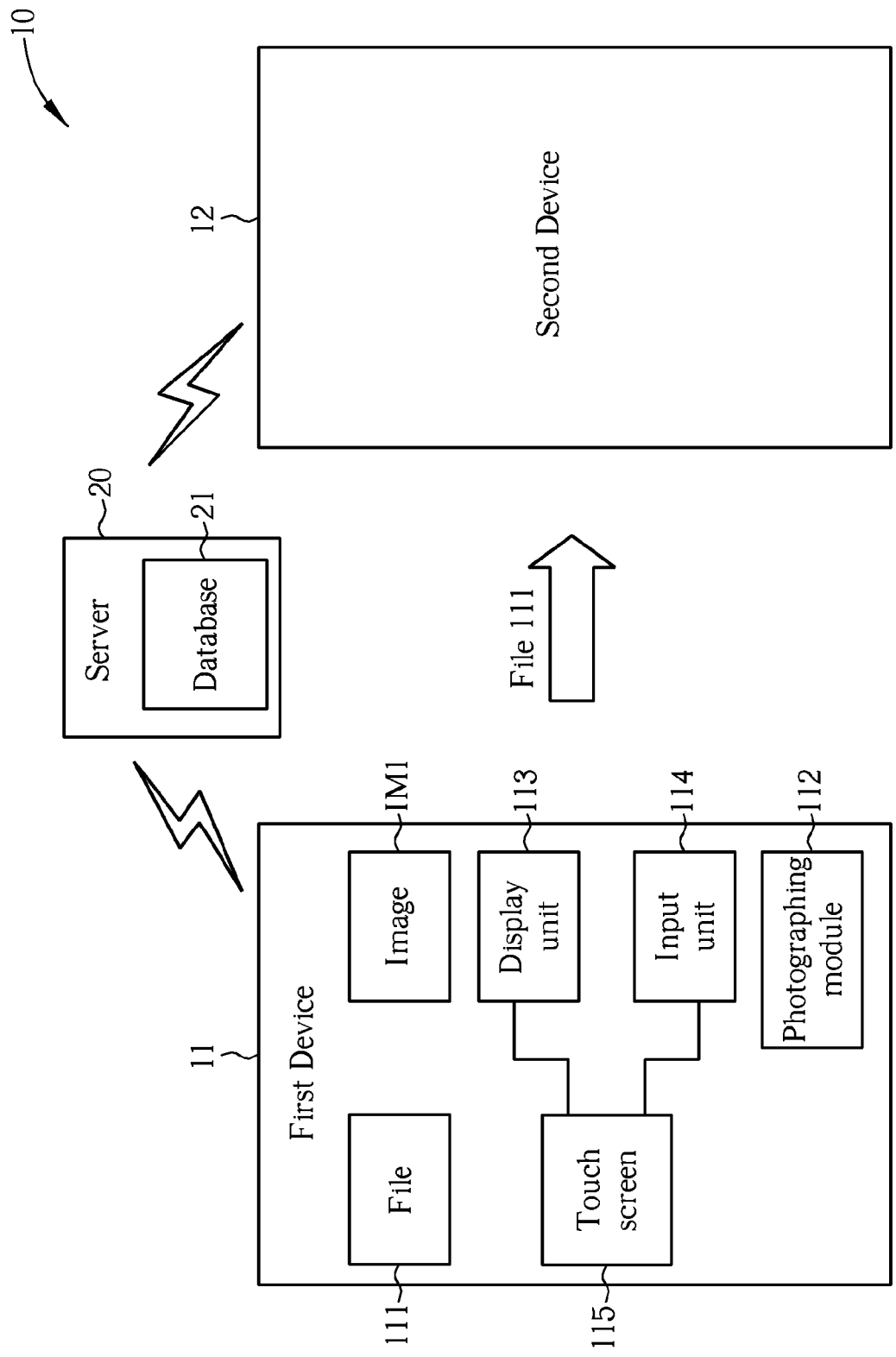
FIG. 1C is a block diagram showing a file transfer system according to a second embodiment of the present invention.

As shown in FIG. 1B, a flowchart illustrating an augmented reality-based file transfer method integrated with cloud computing is provided, such that the first user of the first device 11 and the second user of the second device 12 are able to transfer file(s) to each other. The first device 11 is wirelessly connected to the second device 12. Be noted that the file may include videos, photos, data files, or other files. Furthermore, in other embodiments, the first device 11 and the second device 12 of the file transfer system 10 can be further wirelessly connected to a server 20. As shown in FIG. 1C, the server 20 includes a database 21, and the database 21 is configured to store a plurality of photos comprising faces of different users as a comparison basis.

In the following paragraphs, the steps of the augmented reality-based file transfer method integrated with cloud computing are described in details:

Step (S101): First, one of the files stored in the first device 11 is opened by the first user, wherein the file includes an image of the second user; or the photographing module 112 of the first device 11 is manipulated by the first user for capturing an image (such as a dynamic video or a static photo) of the second user, wherein the image includes a face image of the second user.

Step (S102): The file stored in the first device 11 and the image being captured or opened in Step S101 are displayed on the display unit 115 of the first device 11.

Step (S103): When the file to be transferred from the first user to the second user is dragged to the face image of the second user shown in the image via the input unit (such as, inputted by clicking a mouse or by contacting a touch screen with a finger), a command is accordingly generated.

Step (S104): When the file is dragged to the face image of the second user shown in the image and is then released according to the command, a released position on the image where the file is released is captured, and a first coordinate is accordingly generated by using the first device.

Step (S105): Transfer the first coordinate and the image from the first device to the server.

Step (S106): After the first coordinate and the image are received by the server, a face detection is performed in order to find out the position of the face image of the second user shown in the image, and a second coordinate is accordingly generated. Determine whether the first coordinate falls on the second coordinate. If the first coordinate falls on the second coordinate, go to step (S107); or if the first coordinate does not fall on the second coordinate, go to step (S111).

Step (S107): If the first coordinate falls on the second coordinate, a face recognition is performed through the server in order to determine the identity of the second user.

Step (S108): The server compare the face of the second user with the faces of different users of the plurality of photos stored in the database and find out the data of the second device, and accordingly generate a response message, wherein the database includes a first Internet protocol (IP) address of the first device and a second IP address of the second device.

Step (S109): Transfer the file from the first device to the server according to the response message.

Step (S110): According to the compared result of the database, the server search the second IP address of the second device and then transfer the file from the server to the second device. In one embodiment, when the second device and the server are in a disconnected state, the file is temporarily stored in the database through the server. After the second device is wirelessly connected to the server, the server transfers the file to the second device. Additionally, in order to prevent from insufficient storage capability, the server is able to transfer the file to the web storage of the second device by using an e-mail, a communication software (such as MSN or Yahoo! Messenger), or a file transfer protocol (ftp).

Step (S111): If the first coordinate does not fall on the second coordinate, an error message is transmitted from the server to the first device. After that, go back to the step (S103), such that the file is re-dragged to the face image of the second user shown in the image by manipulating the first device through the first user according to the error message.

Figure 2:
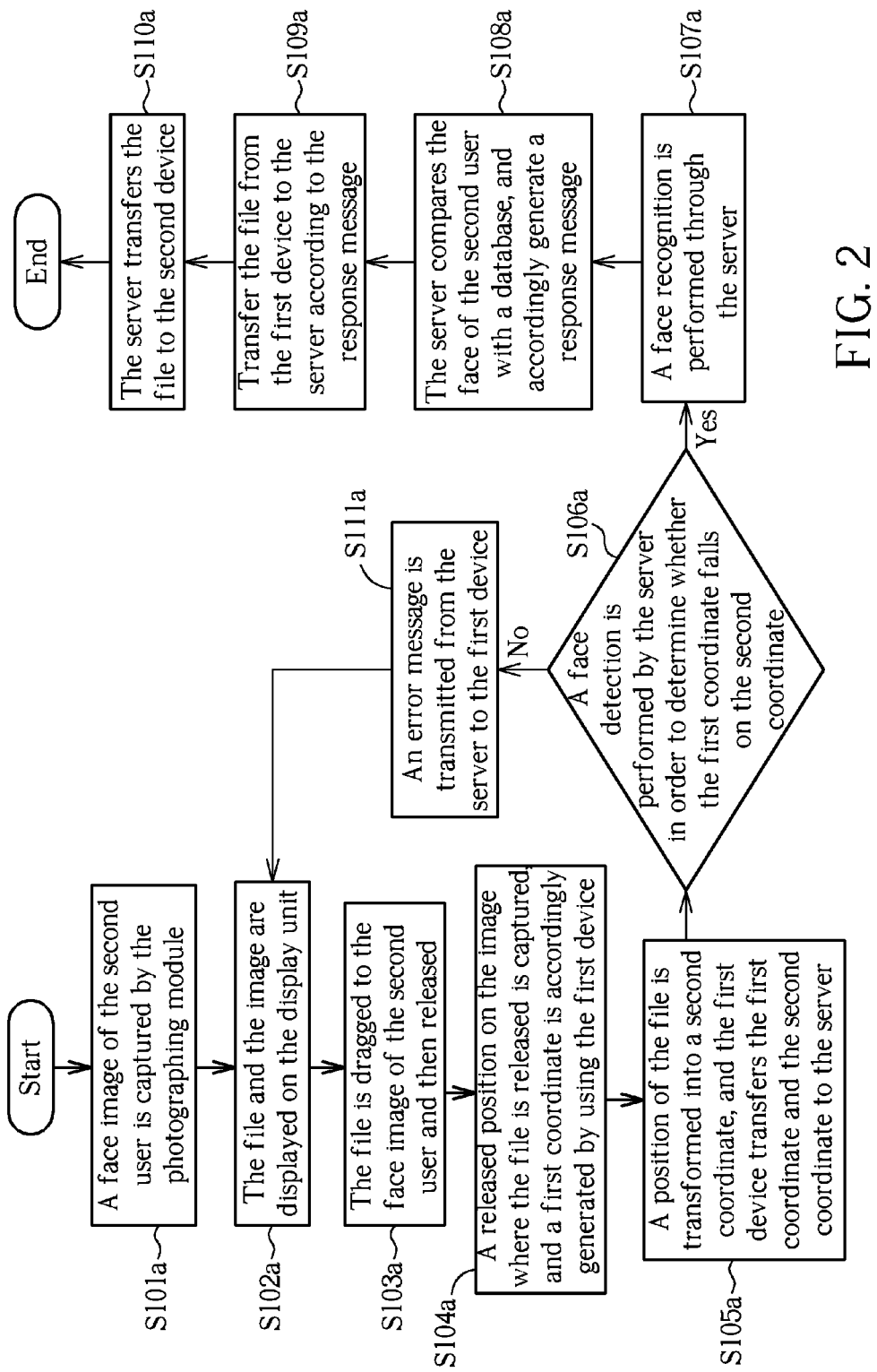
FIG. 2 is a flowchart illustrating a file transfer method according to another exemplary embodiment of the present invention.

Furthermore, a file transfer method according to a second embodiment of the present invention is shown in FIG. 2, which includes the following steps:

Step (S101a): First, one of the files stored in the first device is opened by the first user, wherein the file includes an image of the second user; or the photographing module 112 of the first device 11 is manipulated by the first user for capturing an image (such as a dynamic video or a static photo) of the second user, wherein the image includes a face image of the second user.

Step (S102a): The file stored in the first device 11 and the image being captured or opened in Step S101a are displayed on the display unit 115 of the first device 11.

Step (S103a): When the file to be transferred from the first user to the second user is dragged to the face image of the second user shown in the image via the input unit (such as, inputted by clicking a mouse or by contacting a touch screen with a finger), a command is accordingly generated.

Step (S104a): When the file is dragged to the face image of the second user shown in the image and is then released according to the command, a released position on the image where the file is released is captured, and a first coordinate is accordingly generated by using the first device.

Step (S105a): After a position of the file is transformed into a second coordinate by the first device, the first coordinate and the second coordinate are transferred to the server by the first device.

Step (S106a): After the first coordinate and the second coordinate are received by the server, a face detection is performed in order to determine whether the first coordinate falls on the second coordinate. If the first coordinate falls on the second coordinate, go to step (S107a); or if the first coordinate does not fall on the second coordinate, go to step (S111a).

Step (S107a): If the first coordinate falls on the second coordinate, a face recognition is performed through the server in order to determine the identity of the second user.

Step (S108a): The server compare the face of the second user with the faces of different users of the plurality of photos stored in the database and find out the data of the second device, and accordingly generate a response message, wherein the database includes a first Internet protocol (IP) address of the first device and a second IP address of the second device.

Step (S109a): Transfer the file from the first device to the server according to the response message.

Step (S110a): According to the compared result of the database, the server search the second IP address of the second device and then transfer the file from the server to the second device. In one embodiment, when the second device and the server are in a disconnected state, the file is temporarily stored in the database through the server. After the second device is wirelessly connected to the server, the server transfers the file to the second device. Additionally, in order to prevent from insufficient storage capability, the server is able to transfer the file to the web storage of the second device by using an e-mail, a communication software (such as MSN or Yahoo! Messenger), or a file transfer protocol (ftp).

Step (S111a): If the first coordinate does not fall on the second coordinate, an error message is transmitted from the server to the first device. After that, go back to the step (S103), such that the face image of the image is re-dragged to the file by manipulating the first device through the first user according to the error message.

Figure 3:
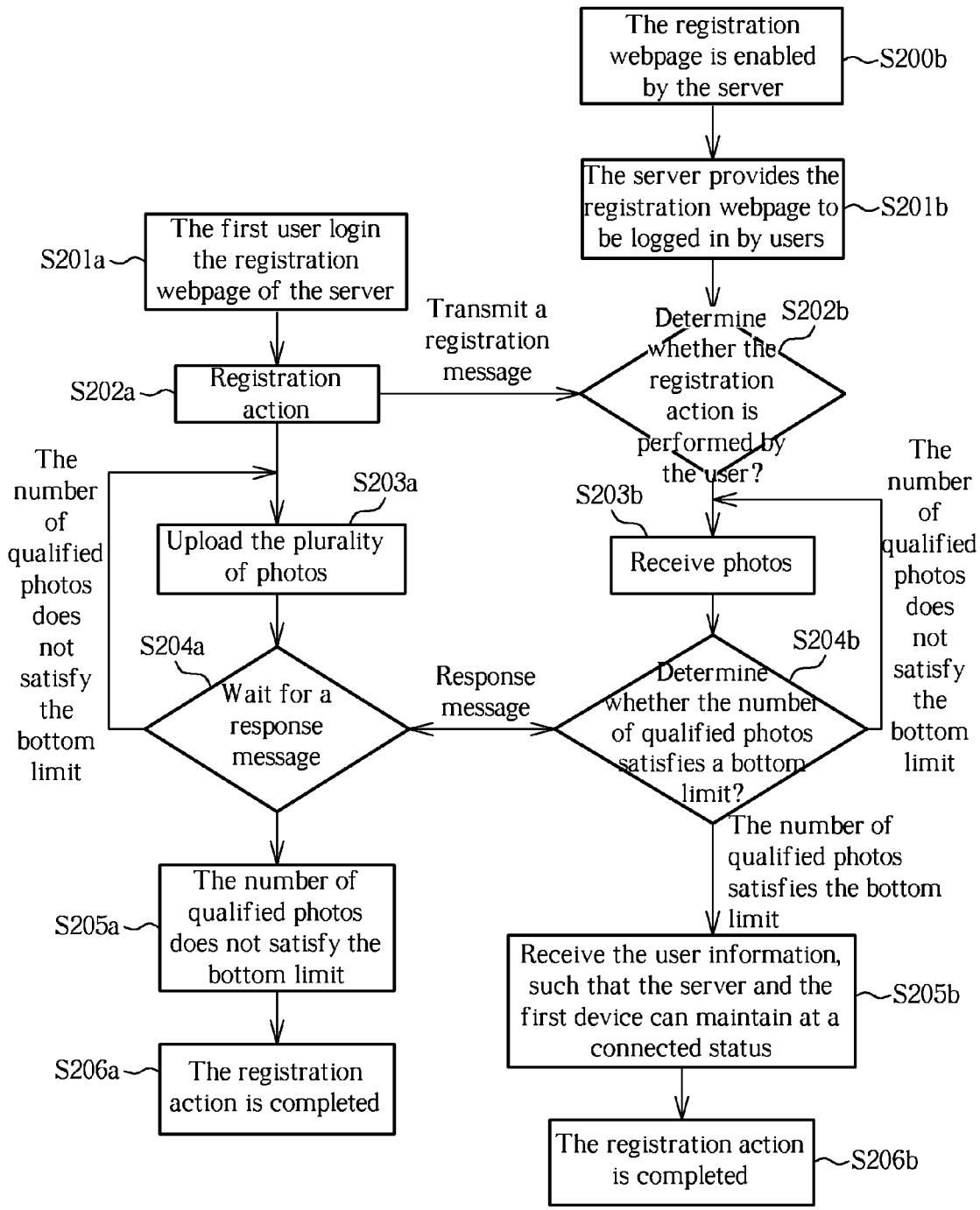
FIG. 3 is a flowchart illustrating a registration action performed between devices and a server.

In order to satisfy that the server located in the cloud computing platform is able to speed up the file transfer (s) between the first device and the second device, the first device and the second device must perform a registration action to the server. FIG. 3 is a flowchart illustrating a registration action performed between devices (such as, the first device or the second device) and a server. First, before the file transfer is started, the first user needs to perform the registration action to the server through the first device itself according to the following steps, the second user can perform the registration action to the server through the second device itself according to the following steps, or the first user can help the second user to perform the registration action to the server through the first device according to the following steps. In the following paragraphs, the details for illustrating how the first user or the second user performs the registration action to the server through the first device are provided, which includes the following steps:

Step (S201a): The first user who owns the first device login the registration webpage of the server.

Step (S202a): The first device transmits a registration message to the server. Before performing the registration action to the server, a plurality of photos comprising one of a face image of the first user and a face image of the second user are captured by the photographing module, wherein the photos must include clear face images.

Step (S203a): Upload the plurality of photos, by the first device, to the server.

Step (S204a): After the plurality of photos are received by the server, the first device receives a response message from the server in order to determine whether a number of the plurality of photos satisfies a bottom limit set by the server and whether the face images of the plurality of photos conform to a qualified criterion. When the response message indicates that the face images of the photos conform to the qualified criterion and the number of the uploaded photos satisfies the bottom limit, go to step (S205a). When the response message indicates that the number of the uploaded photos does not satisfy the bottom limit of the server, the first device receives a notice message from the server. After that, go to step (S203a) in order to re-upload a plurality of new photos, by the first device, to the server.

Step (S205a): If the response message indicates that the face images of the photos conform to the qualified criterion and the number of the uploaded photos satisfies the bottom limit, the plurality of photos confirming to the qualified criterion are stored into the database. In addition, a user list is provided as the comparison reference for face recognition, wherein the user list includes the photos of the face images of the users and the device information of the users (such as, IP addresses and basic information required for file transfers).

Step (S206a): After the abovementioned steps are done, the registration action is completed.

Be noted that, at the same time that the first device is performing the registration action to the server, the response action which the server replies to the first device includes the following steps:

Step (S200b): First, the registration webpage of the server is enabled by the server.

Step (S201b): The server provides the registration webpage to be logged in by users.

Step (S202b): In accordance with the step (S202a), the server is waiting for the registration action of the user. If the registration action is performed by the user, the registration message transmitted from the first device is received by the server.

Step (S203b): In accordance with the step (S203a), the plurality of photos uploaded through the first device is received by the server, wherein the photos include the faces of the users.

Step (S204b): In accordance with the step (S204a), the server determine whether a number of the plurality of photos satisfies a bottom limit set by the server and whether the face images of the plurality of photos conform to a qualified criterion. When the face images of the photos conform to the qualified criterion and the number of the uploaded photos satisfies the bottom limit, the server transmit the response message to the first device for indicating that the face images of the photos conform to the qualified criterion and the number of the uploaded photos satisfies the bottom limit. In addition, the plurality of photos confirming to the qualified criterion are stored into the database by the server. After that, go to step (S205b). When the response message indicates that the number of the uploaded photos does not satisfy the bottom limit of the server, the server sends a notice message to the first device for indicating that the number of the uploaded photos does not satisfy the bottom limit of the server. After that, go back to the step (S203b) in order to re-get a plurality of new photos from the first device.

Step (S205b): In accordance with the step (S205a), the server receives the user information (such as, the IP address of the first device) sent by the first device, such that the server and the first device can maintain at a connected status.

Step (S206b): After the abovementioned steps are done, the server sends a notice to the user of the first device that the registration action is completed.

Figure 4:
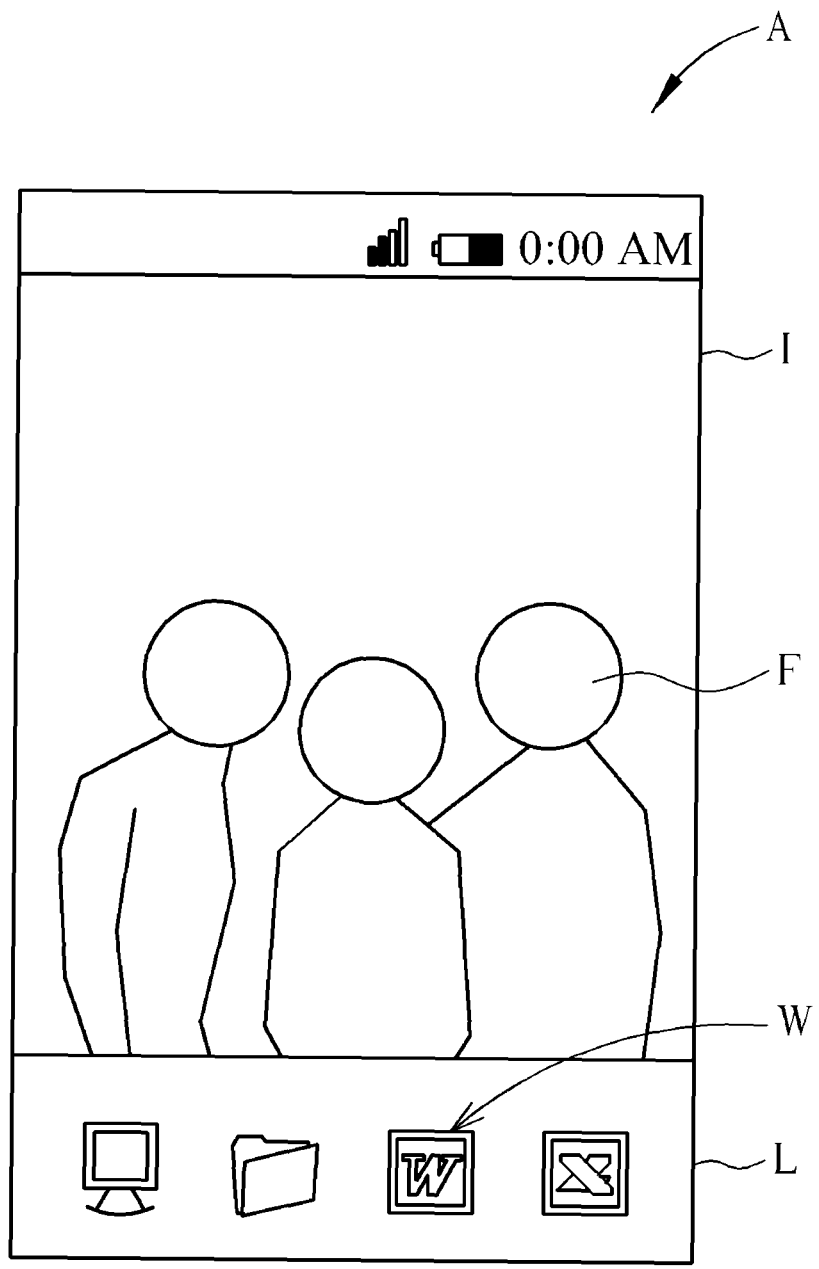
FIG. 4 is a diagram showing a user interface of a mobile device according to an embodiment of the present invention.

In one embodiment, the file transfer device applying such a file transfer method may be implemented by a mobile phone A, which includes a photographing module and a touch screen and has a wireless transfer function. During manipulating the mobile phone, the user can see a user interface of the mobile phone as shown in FIG. 4. Since the mobile phone A includes a touch screen, the touch screen has both functions of the display unit and the input unit. In FIG. 4, the bar shown in the bottom of the user interface represents the file list L, wherein the file list L may cover various types of files W stored in the subscriber identity module (SIM) card and/or expansion storage devices (such as, secure digital card, SD card). For example, the file list L may include video files, photos, word files, excel files, and etc. Moreover, the image I captured by the photographing module can be displayed in the top of the user interface, wherein the image I includes a plurality of human faces, and the face image F represents another user (such as, the second user) who will receive the files from the first user.

Figure 5:
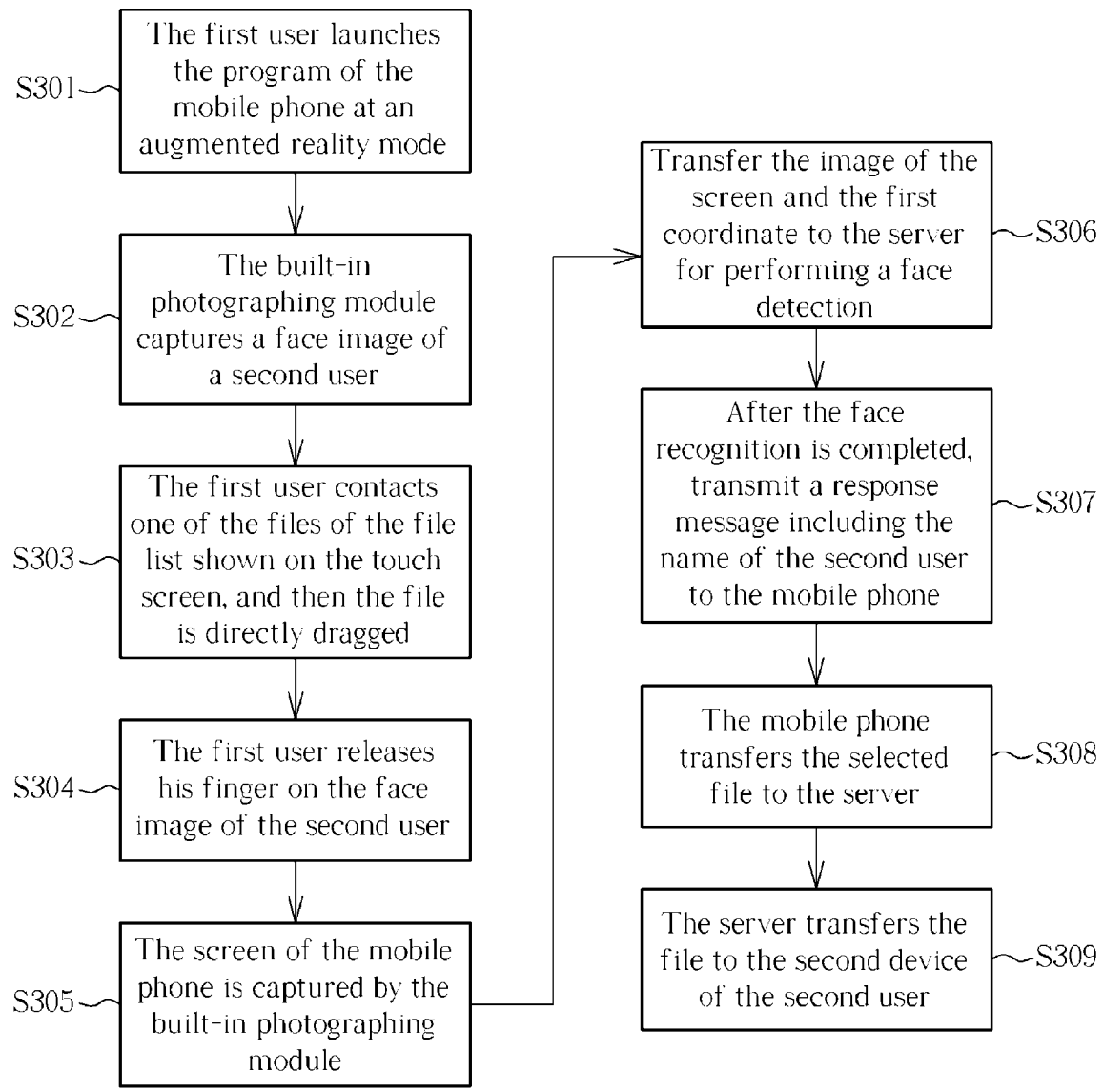
FIG. 5 is a flowchart illustrating an augmented reality-based file transfer method applied to a mobile device (such as, a smart phone or a tablet) shown in FIG. 4.

Please refer to FIG. 5. FIG. 5 is a flowchart illustrating an augmented reality-based file transfer method applied to a mobile device (such as, a smart phone or a tablet) shown in FIG. 4. The method includes the following steps:

Step (S301): The first user launches the program of the mobile phone at an augmented reality mode.

Step (S302): The built-in photographing module of the mobile phone is manipulated by the first user in order to capture a face image of a second user, or the file comprising a face image of the second user stored in the mobile phone is directly opened by the first user in order to display the face image of the second user on the touch screen.

Step (S303): The first user contacts one of the files of the file list L shown on the touch screen, and then the file is directly dragged to the face image F of the second user in accordance with finger's moving.

Step (S304): The first user releases his finger on the face image F of the second user.

Step (S305): At the moment the finger is released, the screen of the mobile phone is captured by the built-in photographing module of the mobile phone, and a released position on the image where the file is released is captured in order to accordingly generate a first coordinate.

Step (S306): Transfer the image of the screen and the first coordinate to the server. After the first coordinate and the image are received by the server, a face detection is performed by the server in order to determine whether the position of the face image of the second user shown in the image falls in a predefined range. If the coordinate of the face image of the second user shown in the image does not fall in the predefined range, the server transmits an error message to the mobile phone for notifying the first user to re-operate the abovementioned steps. On the other hand, if the coordinate of the face image of the second user shown in the image falls in the predefined range, the server performs a face recognition in order to compare the face image of the second user with the faces of all users stored in the user list of the server.

Step (S307): Until the correct face image in the user list is searched, the face recognition is completed, and a response message is transmitted from the server to the mobile phone, wherein the response message includes the name of the face image of the second user.

Step (S308): The mobile phone transfers the selected file to the server.

Step (S309): The server transfers the file to the second device of the second user. After the file transfer is completed, the server further transmits a successful transfer message to the mobile phone. If the second device owned by the second user and the server are in a connected status, the file can be immediately received by the second device. Otherwise, the file will be received by the second device after the second device builds up a connection with the server.

The file transfer method and the file transfer system disclosed in the present invention not only can provide a simple and user-friendly interface to the user for performing file transfer(s) between devices, but also the manipulation complexity can be effectively reduced through simple operations with finger's dragging. Hence, the augmented reality-based file transfer method and file transfer system integrated with cloud computing disclosed in the present invention can be applied to mobile phone manufactures, computer manufactures, or other information communication manufactures, and its applicable products can cover mobile phones, tablets, and other electronic products with a photographing module and a display unit.

Those skilled in the art will readily observe that numerous modifications and alterations of the device and method may be made while retaining the teachings of the invention.

What is claimed is:

1. A file transfer method, applied to file transmission between a first device owned by a first user and a second device owned by a second user, the first device being wirelessly connected to the second device, the first device comprising a file, a display unit, and an input unit electronically connected to the display unit, the method comprising the following steps:

when an image stored in the first device is opened, displaying the file and the image on the display unit of the first device, wherein the image comprises a face image of the second user;

when the file is dragged to the face image of the second user shown in the image via the input unit and is then released, generating a command; and transferring the file from the first device to the second device according to the command, wherein the first device and the second device are wirelessly connected to a server, and the step of transferring the file from the first device to the second device comprises:

storing a plurality of photos comprising faces of different users into a database of the server as a comparison basis;

when the file is dragged to the face image of the second user shown in the image and is then released, capturing a released position on the image where the file is released and accordingly generating a first coordinate by using the first device;

transferring the first coordinate and the image from the first device to the server;

after the first coordinate and the image are received by the server, performing a face detection in order to find out the position of the face image of the second user shown in the image, and accordingly generating a second coordinate;

determining whether the first coordinate falls on the second coordinate;

if the first coordinate does not fall on the second coordinate, transmitting an error message to the first device through the server, such that the file is re-dragged to the face image of the second user shown in the image according to the error message;

if the first coordinate falls on the second coordinate, performing a face recognition through the server in order to compare the face of the second user with the faces of different users of the plurality of photos stored in the database, and accordingly generating a response message;

transmitting, by the server, the response message to the first device;

transferring the file from the first device to the sever according to the response message; and transferring the file from the server to the second device.

2. The file transfer method according to claim 1, wherein the first device further comprising a photographing module, and the method further comprising:

capturing the image comprising the face image of the second user by manipulating the photographing module.

3. The file transfer method according to claim 1, further comprising:

performing, by the first device, a registration action to the server;

uploading the plurality of photos, by the first device, to the server, wherein each of the plurality of photos comprises one of a face image of the first user and a face image of the second user;

after the plurality of photos are received by the server, a response message is received by the first device from the server in order to determine whether the face images of the plurality of photos conform to a qualified criterion and whether a number of the plurality of photos satisfies a bottom limit set by the server; and when the response message indicates that the face images of the photos conform to the qualified criterion and the number of the uploaded photos satisfies the bottom limit, storing the plurality of photos confirming to the qualified criterion into the database in order to complete the registration action.

4. The file transfer method according to claim 3, wherein the step of determining whether the face images of the plurality of photos conform to the qualified criterion and whether the number of the plurality of photos satisfies the bottom limit set by the server comprises:

when the number of the uploaded photos does not satisfies the bottom limit, a notice message is received by the first device from the server; and re-uploading a plurality of new photos, by the first device, to the server.

5. The file transfer method according to claim 1, further comprising:

when the second device and the server are in a disconnected state, temporarily storing the file in the database through the server.

6. The file transfer method according to claim 1, further comprising:

when the second device and the server are in a disconnected state, transferring the file from the server to the second device by using an e-mail, a communication software, or a file transfer protocol (ftp).

7. A file transfer method, applied to file transmission between a first device owned by a first user and a second device owned by a second user, the first device being wirelessly connected to the second device, the first device comprising a file, a display unit, and an input unit electronically connected to the display unit, the method comprising the following steps:

when an image of the second user stored in the first device is opened, displaying the file and the image on the display unit of the first device, wherein the image comprises a face image of the second user;

when the face image is dragged to the file via the input unit and is then released, generating a command; and transferring the file from the first device to the second device according to the command, wherein the first device and the second device are wirelessly connected to a server, and the step of transferring the file from the first device to the second device comprises:

storing a plurality of photos comprising faces of different users into a database of the server as a comparison basis;

when the face image of the image is dragged to the file and is then released, capturing a released position on the file where the face image of the image is released and accordingly generating a first coordinate by using the first device;

transforming, by the first device, a position of the file into a second coordinate;

transferring, by the first device, the first coordinate and the second coordinate to the server:

after the first coordinate and the second coordinate are received by the server, performing a face detection in order to determine whether the first coordinate falls on the second coordinate;

if the first coordinate does not fall on the second coordinate, transmitting an error message to the first device through the server, such that the face image of the image is re-dragged to the file according to the error message;

if the first coordinate falls on the second coordinate, performing a face recognition through the server in order to compare the face of the image with the faces of different users of the plurality of photos stored in the database, and accordingly generating a response message;

transmitting, by the server, the response message to the first device;

transferring the file from the first device to the server according to the response message; and transferring the file from the server to the second device.

8. The file transfer method according to claim 7, wherein the first device further comprises a photographing module, and the method further comprising:

capturing the image comprising the face image of the second user by manipulating the photographing module.

9. A file transfer system, comprising:

a first device, owned by a first user, the first device comprising:

a file;

a display unit;

an input unit; and a processing unit, electrically connected to the display unit and the input unit; and a second device, owned by a second user;

wherein, when an image stored in the first device is opened, the display unit of the first device is configured to display the file and the image, wherein the image comprises a face image of the second user;

when the file is dragged to the face image of the second user shown in the image via the input unit of the first device and is then released, the processing unit is configured to generate a command; and the file is transferred from the first device to the second device according to the command, wherein the file transfer system further comprises a server wirelessly connected to the first device and the second device, and the server further comprises:

a database, configured to store a plurality of photos comprising faces of different users as a comparison basis;

wherein, when the file is dragged to the face image of the second user shown in the image and is then released, the first device is configured to capture a released position on the image where the file is released and accordingly generate a first coordinate, and transfer the first coordinate and the image from the first device to the server;

after the first coordinate and the image are received by the server, a face detection is performed, through the server, in order to find out the position of the face image of the second user shown in the image and accordingly generate a second coordinate;

the server is further configured to determine whether the first coordinate falls on the second coordinate;

if the first coordinate does not fall on the second coordinate, an error message is transmitted to the first device through the server, such that the file is re-dragged to the face image of the second user shown in the image according to the error message;

if the first coordinate falls on the second coordinate, a face recognition is performed through the server in order to compare the face of the second user with the faces of different users of the plurality of photos stored in the database, and a response message is accordingly generated;

the response message is transmitted, by the server, to the first device;

the file is transferred from the first device to the server according to the response message; and the file is transferred from the server to the second device.

10. The file transfer system according to claim 9, wherein the first device further comprises a photographing module configured to capture the image comprising the face image of the second user.

11. The file transfer system according to claim 9, wherein the first device is further configured to perform a registration action to the server, and upload the plurality of photos to the server, wherein each of the plurality of photos comprises one of a face image of the first user and a face image of the second user; and the server is further configured to receive the plurality of photos in order to determine whether the face images of the plurality of photos conform to a qualified criterion and whether a number of the plurality of photos satisfies a bottom limit set by the server, and store the plurality of photos confirming to the qualified criterion into the database in order to complete the registration action when the number of the uploaded photos satisfies the bottom limit.

12. A file transfer system, comprising:

a first device, owned by a first user, comprising:

a file;

a display unit;

an input unit; and a processing unit, electrically connected to the display unit and the input unit; and a second device, owned by a second user;

wherein, when an image of the second user stored in the first device is opened, the display unit of the first device is configured to display the file and the image, wherein the image comprises a face image of the second user;

when the face image is dragged to file via the input unit and is then released, the processing unit is configured to generate a command; and the file is transferred from the first device to the second device according to the command, wherein the file transfer system further comprises a server wirelessly connected to the first device and the second device, and the server further comprises:

a database, configured to store a plurality of photos comprising faces of different users as a comparison basis;

wherein, when the face image of the image is dragged to the file and is then released, the first device is configured to capture a released position on the file where the face image of the image is released and accordingly generate a first coordinate, transform a position of the file into a second coordinate, and transmit the first coordinate and the second coordinate to the server;

after the first coordinate and the second coordinate are received by the server, a face detection is performed, through the server, in order to determine whether the first coordinate falls on the second coordinate;

if the first coordinate does not fall on the second coordinate, an error message is transmitted to the first device through the server, such that the face image of the image is re-dragged to the file according to the error message;

if the first coordinate falls on the second coordinate, a face recognition is performed through the server in order to compare the face of the second user with the faces of different users of the plurality of photos stored in the database, and a response message is accordingly generated;

the response message is transmitted, by the server, to the first device;

the file is transferred from the first device to the server according to the response message; and the file is transferred from the server to the second device.

* * * * *